(12) United States Patent
Mellet et al.

(10) Patent No.: US 9,279,478 B2
(45) Date of Patent: Mar. 8, 2016

(54) MULTI-SPEED TRANSMISSION

(71) Applicant: GM Global Technology Operations LLC, Detroit, MI (US)

(72) Inventors: Edward W. Mellet, Rochester Hills, MI (US); Craig S. Ross, Ypsilanti, MI (US); James M. Hart, Belleville, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 76 days.

(21) Appl. No.: 14/201,225

(22) Filed: Mar. 7, 2014

(65) Prior Publication Data

US 2015/0252877 A1  Sep. 10, 2015

(51) Int. Cl.
*F16H 3/44* (2006.01)
*F16H 3/62* (2006.01)

(52) U.S. Cl.
CPC .......... *F16H 3/62* (2013.01); *F16H 2200/0078* (2013.01); *F16H 2200/2012* (2013.01)

(58) Field of Classification Search
CPC .............. F16H 3/62; F16H 2200/2012; F16H 2200/0078; F16H 2200/2048
See application file for complete search history.

(56) References Cited

U.S. PATENT DOCUMENTS

| | | | |
|---|---|---|---|
| 5,120,284 A * | 6/1992 | Asada | 475/278 |
| 6,991,578 B2 | 1/2006 | Ziemer | |
| 7,018,319 B2 | 3/2006 | Ziemer | |
| 7,402,119 B2 | 7/2008 | Kamada et al. | |
| 8,152,683 B2 | 4/2012 | Phillips | |
| 8,343,007 B2 | 1/2013 | Hart et al. | |
| 8,465,390 B2 | 6/2013 | Brehmer et al. | |
| 8,632,435 B2 | 1/2014 | Garcia et al. | |
| 8,651,996 B2 | 2/2014 | Mellet et al. | |
| 8,734,286 B2 | 5/2014 | Coffey et al. | |
| 8,758,185 B2 | 6/2014 | Mellet et al. | |
| 8,795,127 B2 | 8/2014 | Singh | |
| 8,795,128 B2 | 8/2014 | Mellet et al. | |
| 8,801,564 B2 | 8/2014 | Singh | |
| 8,870,705 B2 | 10/2014 | Diemer et al. | |
| 8,915,819 B2 | 12/2014 | Coffey et al. | |
| 2005/0113205 A1 * | 5/2005 | Oguri et al. | 475/275 |
| 2007/0298932 A1 * | 12/2007 | Yoneyama | 477/120 |
| 2013/0196813 A1 * | 8/2013 | Oita et al. | 475/284 |
| 2013/0260942 A1 | 10/2013 | Garcia et al. | |
| 2013/0267369 A1 * | 10/2013 | Beck et al. | 475/275 |
| 2013/0274058 A1 * | 10/2013 | Beck et al. | 475/275 |
| 2014/0248989 A1 | 9/2014 | Hart et al. | |
| 2014/0256500 A1 | 9/2014 | Mellet et al. | |

\* cited by examiner

*Primary Examiner* — David J Hlavka

(57) ABSTRACT

A transmission is provided having an input member, an output member, at least four planetary gear sets, a plurality of coupling members and a plurality of torque transmitting devices. Each of the planetary gear sets includes first, second and third members. The torque transmitting devices include clutches and a brake actuatable in combinations of four to establish a plurality of forward gear ratios and at least one reverse gear ratio.

22 Claims, 2 Drawing Sheets

| GEAR STATE | GEAR RATIO | TORQUE TRANSMITTING ELEMENTS ||||||| 
| | | 36 | 34 | 28 | 30 | 24 | 32 | 26 |
|---|---|---|---|---|---|---|---|---|
| REV | -4.911 | X | X | | X | | X | |
| N | | | | | | | | |
| 1ST | 4.724 | X | X | | | X | | |
| 1ST | 4.724 | X | X | | | X | X | |
| 1ST | 4.724 | X | X | X | | X | | |
| 1ST | 4.724 | X | X | | X | X | | |
| 2ND | 3.015 | X | X | X | X | | | |
| 3RD | 2.180 | X | | X | X | X | | |
| 4TH | 1.793 | X | | X | X | | X | |
| 5TH | 1.535 | X | | X | | X | X | |
| 6TH | 1.465 | X | | X | X | | | X |
| 7TH | 1.283 | X | | | X | X | X | |
| 8TH | 1.118 | X | | | | X | | X |
| 8TH | 1.118 | X | | | | X | X | X |
| 8TH | 1.118 | X | | X | | X | | X |
| 8TH | 1.124 | X | | | X | X | | X |
| 9TH | 1.022 | X | | | X | | X | X |
| 10TH | 1.000 | | | X | X | X | | X |
| 10TH | 1.000 | | | X | X | X | X | |
| 10TH | 1.000 | | | | X | X | X | X |
| 10TH | 1.000 | | | X | | X | X | X |
| 10TH | 1.000 | | | X | X | | X | X |
| 11TH | 0.988 | | X | | X | | X | X |
| 12TH | 0.943 | | X | | | X | | X |
| 12TH | 0.943 | | X | | | X | X | X |
| 12TH | 0.943 | | X | | X | X | | X |
| 12TH | 0.943 | | X | X | | X | | X |
| 13TH | 0.855 | | X | | X | X | X | |
| 14TH | 0.847 | | X | X | X | | | X |
| 15TH | 0.691 | | X | X | | X | X | |
| 16TH | 0.638 | | X | X | X | | X | |

X = ON - ENGAGED CARRYING TORQUE

FIG. 3

MULTI-SPEED TRANSMISSION

FIELD

The invention relates generally to a multiple speed transmission, and more particularly, to a transmission having a plurality of speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness, and improved packaging, primarily reduced size and weight, is essentially constant. Accordingly, there is a need for an improved, cost-effective, compact multiple speed transmission.

SUMMARY

A transmission is provided having an input member, an output member, at least four planetary gear sets, a plurality of coupling members and a plurality of torque transmitting devices. Each of the planetary gear sets includes first, second and third members. The torque transmitting devices may be, for example, clutches and a brake.

The clutches and brake can be of any type including but not limited to a fiction clutch, a friction band, a one way clutch, a selectable one way clutch, a dog clutch, a synchronizer and similar devices. Furthermore, any node can use a single device or a combination of these devices e.g. the brake may be configured as a dog clutch and a one way clutch combination or a one way clutch and friction clutch combination. Similarly, several other combinations are possible.

In another embodiment of the present invention, the transmission includes: first, second, third and fourth planetary gear sets each having a sun gear, a carrier member and a ring gear, and the input member is continuously connected for common rotation with the carrier member of the second planetary gear set, and the output member is continuously connected for common rotation with the carrier member of the fourth planetary gear set.

In yet another embodiment of the present invention, the transmission includes a first interconnecting member continuously interconnecting the ring gear of the first planetary gear set with the ring gear of the fourth planetary gear set.

In yet another embodiment of the present invention, the transmission includes a second interconnecting member continuously interconnecting the sun gear of the first planetary gear set with the sun gear of the second planetary gear set.

In yet another embodiment of the present invention, the transmission includes a third interconnecting member continuously interconnecting the ring gear of the second planetary gear set with the sun gear of the third planetary gear set.

In yet another embodiment of the present invention, the transmission includes a fourth interconnecting member continuously interconnecting the ring gear of the third planetary gear set with the sun gear of the fourth planetary gear set.

In still another embodiment of the present invention, the transmission includes a first torque transmitting mechanism that is selectively engageable to interconnect the ring gear of the third planetary gear set and the sun gear of the fourth planetary gear set with the carrier member of the second planetary gear set and the input member.

In still another embodiment of the present invention, the transmission includes a second torque transmitting mechanism that is selectively engageable to interconnect the carrier member of the first planetary gear set with the ring gear of the second planetary gear set and the sun gear of the third planetary gear set.

In still another embodiment of the present invention, the transmission includes a third torque transmitting mechanism that is selectively engageable to interconnect the ring gear of the second planetary gear set and the sun gear of the third planetary gear set with a common structural member.

In still another embodiment of the present invention, the transmission includes a fourth torque transmitting mechanism that is selectively engageable to interconnect the carrier member of the third planetary gear set with the common structural member.

In still another embodiment of the present invention, the transmission includes a fifth torque transmitting mechanism that is selectively engageable to interconnect the ring gear of the first planetary gear set and the ring gear of the fourth planetary gear set with the common structural member.

In still another embodiment of the present invention, the transmission includes a sixth torque transmitting mechanism that is selectively engageable to interconnect the sun gear of the first planetary gear set and the sun gear of the second planetary gear set with the stationary member.

In still another embodiment of the present invention, the transmission includes a seventh torque transmitting mechanism that is selectively engageable to interconnect the carrier member of the first planetary gear set with the stationary member.

In yet another embodiment of the present invention, the torque transmitting mechanisms are selectively engageable in combinations of at least four to establish a plurality of forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting an example of a state of engagement of various torque transmitting elements to produce multiple forward and at least one reverse speed or gear ratios of the transmissions illustrated in FIGS. 1 and 2.

DETAILED DESCRIPTION

The following description is merely exemplary in nature and is not intended to limit the present disclosure, application, or uses.

At the outset, it should be appreciated that the embodiments of the multi-speed automatic transmission of the present invention have an arrangement of permanent mechanical connections between the elements of the four planetary gear sets. As used herein, coupling or interconnection refers to a direct, continuous, and permanent coupling or interconnection, for example by a rigid member or shaft, between elements. Selective coupling or interconnection, on the other hand, refers to a selective coupling by a clutch or brake, where the clutch or brake can be engaged and disengaged, such that when engaged, the selectively coupled or interconnected elements rotate together, but when disengaged, the selectively coupled or interconnected elements are free to rotate independently.

In an embodiment, a first component or element of the first planetary gear set is permanently coupled to a third component or element of the second planetary gear set. A second component or element of the first planetary gear set is permanently coupled to a third component or element of the fourth planetary gear set. A first component or element of the second planetary gear set is permanently coupled to a first component or element of the third planetary gear set. A third component or element of the third planetary gear set is permanently coupled to a first component or element of the fourth planetary gear set.

Figure 1:
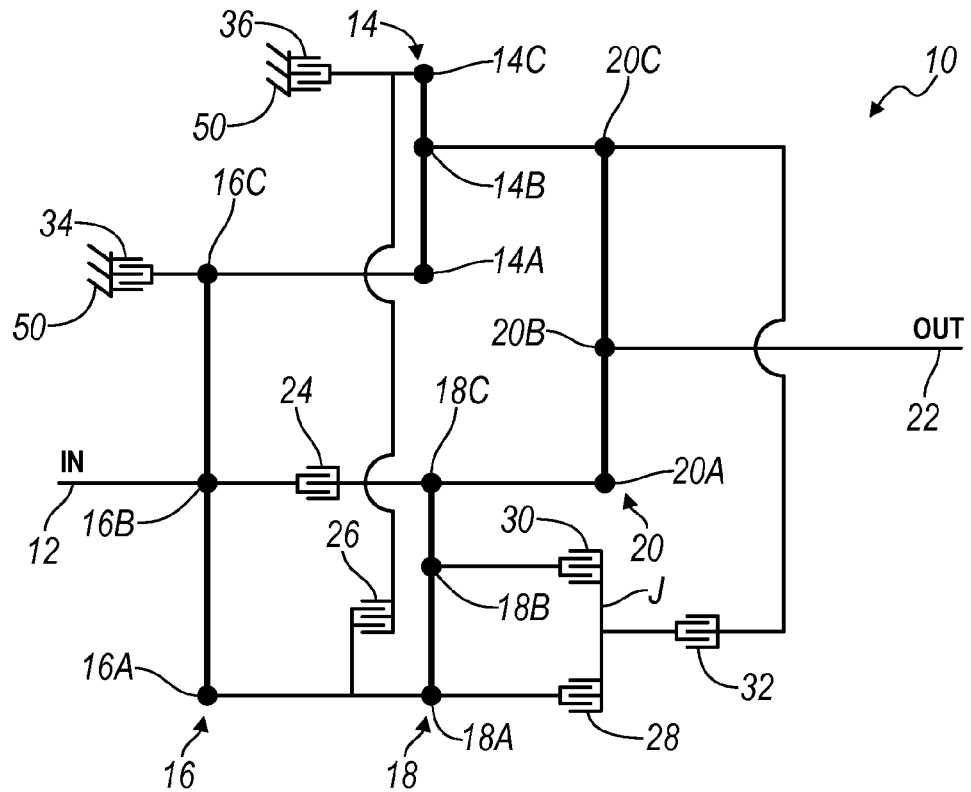
FIG. 1 is a lever diagram of an embodiment of a transmission according to the principles of present invention.

Referring now to FIG. 1, an embodiment of a multi-speed transmission 10 is illustrated in a lever diagram format. A lever diagram is a schematic representation of the components of a mechanical device such as an automatic transmission. Each individual lever represents a planetary gear set wherein the three basic mechanical components of the planetary gear set are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines, and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18, a fourth planetary gear set 20, and an output shaft or member 22. In the lever diagram of FIG. 1, the first planetary gear set 14 has three nodes: a first node 14A, a second node 14B, and a third node 14C. The second planetary gear set 16 has three nodes: a first node 16A, a second node 16B and a third node 16C. The third planetary gear set 18 has three nodes: a first node 18A, a second node 18B and a third node 18C. The fourth planetary gear set 20 has three nodes: a first node 20A, a second node 20B and a third node 20C. The input member 12 is continuously coupled to the second node 16B of the second planetary gear set 16. The output member 22 is continuously coupled to the second node 20B of the fourth planetary gear set 20.

The first node 14A of the first planetary gear set 14 is coupled to the third node 16C of the second planetary gear set 16. The second node 14B of the first planetary gear set 14 is coupled to the third node 20C of the fourth planetary gear set 20. The first node 16A of the second planetary gear set 16 is coupled to first node 18A of the third planetary gear set 18. The third node 18C of the third planetary gear set 18 is coupled to the first node 20A of the fourth planetary gear set 20.

Transmission 10 has a plurality of torque transmitting mechanisms, such as clutches and brakes, which transfer torque from one node or element of the planetary gear sets to another. Moreover, transmission 10 includes a common node J. Common node J is a structural member that interconnects a number of the torque transmitting mechanisms, as described hereinafter.

For example, a first clutch 24 selectively connects the second node 16B of the second planetary gear set 16 and the input member 12 with the third node 18C of the third planetary gear set 18 and the first node 20A of the fourth planetary gear set 20. A second clutch 26 selectively connects the third node 14C of the first planetary gear set 14 with the first node 16A of the second planetary gear set 16 and the first node 18A of the third planetary gear set 18. A third clutch 28 selectively connects the first node 16A of the second planetary gear set 16 and the first node 18A of the third planetary gear set 18 with the common node J. A fourth clutch 30 selectively connects the second node 18B of the third planetary gear set 18 with the common node J. A fifth clutch 32 selectively connects the second node 14B of the first planetary gear set 14 and the third node 20C of the fourth planetary gear set 20 with the common node J. A first brake 34 selectively connects the first node 14A of the first planetary gear set 14 and the third node 16C of the second planetary gear set 16 with the stationary member or transmission housing 50. A second brake 36 selectively connects the third node 14C of the first planetary gear set 14 with the stationary member or transmission housing 50.

Figure 2:
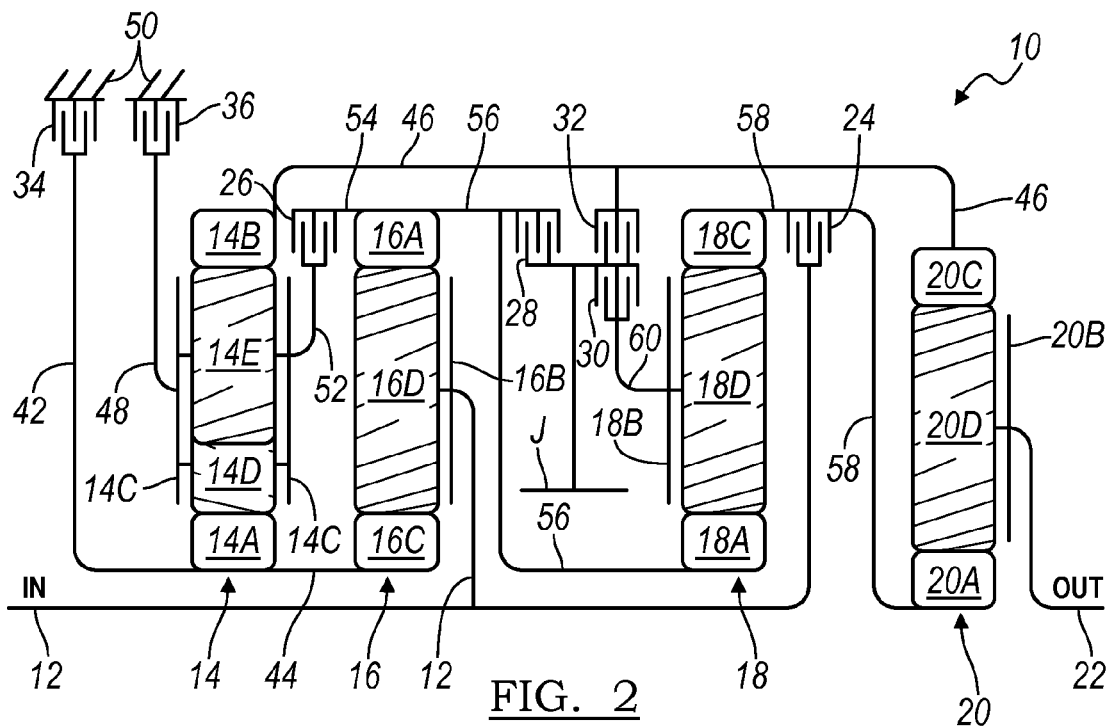
FIG. 2 is a diagrammatic illustration of a variation of the transmission of FIG. 1 according to the principles of the present invention.

Referring now to FIG. 2, a stick diagram presents a schematic layout of an embodiment of the multi-speed transmission 10 according to one form of the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the first planetary gear set 14 includes a sun gear member 14A, a ring gear member 14B and a planet gear carrier member 14C that rotatably supports a first set of planet gears 14D (only one of which is shown) and a second set of planet gears 14E (only one of which is shown). The sun gear member 14A is connected for common rotation with a first shaft or interconnecting member 42 and a second shaft or interconnecting member 44. The ring gear member 14B is connected for common rotation with a third shaft or interconnecting member 46. The planet carrier member 14C is connected for common rotation with fourth shaft or interconnecting member 48 and a fifth shaft or interconnecting member 52. The first set of planet gears 14D are each configured to intermesh with both the sun gear member 14A and the second set of planet gears 14E. The second set of planet gears 14E are each configured to intermesh with both the ring gear member 14B and the first set of planet gears 14D.

The second planetary gear set 16 includes a sun gear member 16C, a ring gear member 16A and a planet gear carrier member 16B that rotatably supports a set of planetary gears 16D (only one of each is shown). The sun gear member 16C is connected for common rotation with the second shaft or interconnecting member 44. The ring gear member 16A is connected for common rotation with a sixth shaft or interconnecting member 54 and the seventh shaft or interconnecting member 56. The planet carrier member 16B is connected for common rotation with the input shaft or member 12. The planet gears 16D are each configured to intermesh with both the ring gear member 16A and the sun gear member 16C.

The third planetary gear set 18 includes a sun gear member 18A, a ring gear member 18C and a planet gear carrier member 18B that rotatably supports a set of planet gears 18D (only one of which is shown). The sun gear member 18A is connected for common rotation with the seventh shaft or interconnecting member 56. The ring gear member 18C is connected for common rotation with an eighth shaft or interconnecting member 58. The planet carrier member 18B is connected for common rotation with a ninth shaft or interconnecting member 60. The planet gears 18D are each configured to intermesh with both the sun gear member 18A and the ring gear member 18C.

The fourth planetary gear set 20 includes a sun gear member 20A, a ring gear member 20C and a planet gear carrier member 20B that rotatably supports a set of planet gears 20D (only one of which is shown). The sun gear member 20A is connected for common rotation with the eighth shaft or interconnecting member 58. The ring gear member 20C is connected for common rotation with the third shaft or interconnecting member 46. The planetary gear carrier member 20B is connected for common rotation with the output shaft or member 22. The planet gears 20D are each configured to intermesh with both the sun gear member 20A and the ring gear member 20C.

The input shaft or member 12 is continuously connected to an input source, such as an engine (not shown) or a turbine of a torque converter or a starting clutch or the like (not shown). The output shaft or member 22 is continuously connected with another output such as the final drive unit or transfer case (not shown).

The torque-transmitting mechanisms, including the first, second, third, fourth and fifth clutches 24, 26, 28, 30, 32 and the brakes 34 and 36 allow for selective interconnection of the shafts or interconnecting members 42, 44, 46, 48, 52, 54, 56, 58 and 60 of the planetary gear sets 14, 16, 18, 20 and the housing 50.

For example, the first clutch 24 is selectively engageable to connect the eighth shaft or interconnecting member 58 for common rotation with the input member 12. The second clutch 26 is selectively engageable to connect the fifth shaft or interconnecting member 52 for common rotation with the sixth shaft or interconnecting member 54. The third clutch 28 is selectively engageable to connect the seventh shaft or interconnecting member 56 with the common member or hub J. The fourth clutch 30 is selectively engageable to connect the ninth shaft or interconnecting member 60 with the common member or hub J. The fifth clutch 32 is selectively engageable to connect the third shaft or interconnecting member 46 with the common member or hub J. The first brake 34 is selectively engageable to connect the first shaft or interconnecting member 42 with the stationary element or the transmission housing 50 in order to restrict the sun gears 14A and 16C from rotating relative to the transmission housing 50. The second brake 36 is selectively engageable to connect the fourth shaft or interconnecting member 48 with the stationary element or the transmission housing 50 in order to restrict the carrier member 14C from rotating relative to the transmission housing 50. In turn, the components of the planetary gear sets connected to each of the connecting members are also connected or restricted accordingly.

Referring now to FIGS. 1, 2 and 3, the operation of the multi-speed transmission 10 will be described. It will be appreciated that transmission 10 is capable of transmitting torque from the input shaft or member 12 to the output shaft or member 22 in multiple forward speed torque ratios and at least one reverse speed or torque ratio. Each forward and reverse speed or torque ratio is attained by engagement of one or more of the torque-transmitting mechanisms (i.e. first clutch 24, second clutch 26, third clutch 28, fourth clutch 30, fifth clutch 32, first brake 34 and second brake 36), as will be explained below.

FIG. 3 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

For example, a reverse gear is established by engaging or activating the fourth clutch 30, the fifth clutch 32, the first brake 34 and the second brake 36. The fourth clutch 30 connects the ninth shaft or interconnecting member 60 with the common member or hub J. The fifth clutch 32 connects the third shaft or interconnecting member 46 with the common member or hub J. The first brake 34 connects the sun gears 14A and 16C with the stationary element or the transmission housing 50 in order to restrict the sun gears 14A and 16C from rotating relative to the transmission housing 50. The second brake 36 connects the carrier member 14C with the stationary element or the transmission housing 50 in order to restrict the carrier member 14C from rotating relative to the transmission housing 50. Likewise, the sixteen forward ratios are achieved through different combinations of clutch and brake engagement, as shown in FIG. 3, by way of example.

It will be appreciated that the foregoing explanation of operation and gear states of the multi-speed embodiment of transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated. Further, the operation and establishment of various gear ratios of transmission 10 are for example provided by the engagement of the torque transmitting elements, as shown in FIG. 3. For example, additional combinations of clutch and brake engagements to establish first gear, eighth gear, tenth gear and twelfth gear are also presented. Advantageously, some of the additional combinations of clutch and brake engagements only require a combination of three clutch and brake engagements instead of four clutch and brake engagements to establish the particular gear ratio.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
    an input member;
    an output member;
    first, second, third and fourth planetary gear sets each having first, second and third members;
    four interconnecting members continuously interconnecting a member of the first, second, third and fourth planetary gear sets with another member of the first, second, third and fourth planetary gear sets; and seven torque transmitting mechanisms wherein two of the seven torque transmitting mechanisms are each selectively engageable to interconnect at least one of the first, second and third members with at least one other of the first, second, third members and wherein three of the seven transmitting mechanisms are continuously interconnected through a torque transmitting mechanism interconnecting member and wherein two of the seven torque transmitting mechanisms are each selectively engageable to interconnect at least one of the first, second and third members with a stationary member, and wherein the seven torque transmitting mechanisms are selectively engageable in combinations of at least four to establish a plurality of forward speed ratios and at least one reverse speed ratio between the input member and the output member.

2. The transmission of claim 1 wherein the four interconnecting members further comprises a first interconnecting member continuously interconnecting a second member of the first planetary gear set with a third member of the fourth planetary gear set, a second interconnecting member continuously interconnecting a first member of the first planetary gear set with a third member of the second planetary gear set, a third interconnecting member continuously interconnecting a first member of the second planetary gear set with a first member of the third planetary gear set and a fourth interconnecting member continuously interconnecting a third member of the third planetary gear set with a first member of the fourth planetary gear set.

3. The transmission of claim 1 wherein a first of the seven torque transmitting mechanisms is selectively engageable to interconnect the third member of the third planetary gear set and the first member of the fourth planetary gear set with the second member of the second planetary gear set and the input member.

4. The transmission of claim 3 wherein a second of the seven torque transmitting mechanisms is selectively engageable to interconnect the third member of the first planetary gear set with the first member of the second planetary gear set and the first member of the third planetary gear set.

5. The transmission of claim 4 wherein a third of the seven torque transmitting mechanisms is selectively engageable to interconnect the first member of the second planetary gear set and the first member of the third planetary gear set with the torque transmitting mechanism interconnecting member.

6. The transmission of claim 5 wherein a fourth of the seven torque transmitting mechanisms is selectively engageable to interconnect the second member of the third planetary gear set with the torque transmitting mechanism interconnecting member.

7. The transmission of claim 6 wherein a fifth of the seven torque transmitting mechanisms is selectively engageable to interconnect the second member of the first planetary gear set and the third member of the fourth planetary gear set with the torque transmitting mechanism interconnecting member.

8. The transmission of claim 7 wherein a sixth of the seven torque transmitting mechanisms is selectively engageable to interconnect the first member of the first planetary gear set and the third member of the second planetary gear set with the stationary member.

9. The transmission of claim 8 wherein a seventh of the seven torque transmitting mechanisms is selectively engageable to interconnect the third member of the first planetary gear set with the stationary member.

10. The transmission of claim 1 wherein the input member is continuously connected for common rotation with the second member of the second planetary gear set and the output member is continuously connected for common rotation with the second member of the fourth planetary gear set.

11. The transmission of claim 1 wherein the first member of the first planetary gear set, the third member of the second planetary gear set, the first member of the third planetary gear set and the first member of the fourth planetary gear set are sun gears, the second members of the second, third and fourth planetary gear sets and the third member of the first planetary gear set are carrier members and the second member of the first planetary gear set, the first member of the second planetary gear set, the third member of the third planetary gear set and the third member of the fourth planetary gear set are ring gears.

12. A transmission comprising:
an input member;
an output member;
first, second, third and fourth planetary gear sets each having first, second and third members;
a first interconnecting member continuously interconnecting a second member of the first planetary gear set with a third member of the fourth planetary gear set;
a second interconnecting member continuously interconnecting a first member of the first planetary gear set with a third member of the second planetary gear set;
a third interconnecting member continuously interconnecting a first member of the second planetary gear set with a first member of the third planetary gear set;
a fourth interconnecting member continuously interconnecting a third member of the third planetary gear set with a first member of the fourth planetary gear set; and
seven torque transmitting mechanisms each selectively engageable to interconnect at least one of the first, second, and third members with at least one other of the first, second, third members and a stationary member and wherein three of the seven transmitting mechanisms are continuously interconnected through a torque transmitting mechanism interconnecting member, and wherein the seven torque transmitting mechanisms are selectively engageable in combinations of at least four to establish a plurality of forward speed ratios and at least one reverse speed ratio between the input member and the output member.

13. The transmission of claim 12 wherein a first of the seven torque transmitting mechanisms is selectively engageable to interconnect the third member of the third planetary gear set and the first member of the fourth planetary gear set with the second member of the second planetary gear set input member.

14. The transmission of claim 13 wherein a second of the seven torque transmitting mechanisms is selectively engageable to interconnect the third member of the first planetary gear set with the first member of the second planetary gear set and the first member of the third planetary gear set.

15. The transmission of claim 14 wherein a third of the seven torque transmitting mechanisms is selectively engageable to interconnect the first member of the second planetary gear set and the first member of the third planetary gear set with the torque transmitting mechanism interconnecting member.

16. The transmission of claim 15 wherein a fourth of the seven torque transmitting mechanisms is selectively engageable to interconnect the second member of the third planetary gear set with the torque transmitting mechanism interconnecting member.

17. The transmission of claim 16 wherein a fifth of the seven torque transmitting mechanisms is selectively engageable to interconnect the second member of the first planetary gear set and the third member of the fourth planetary gear set with the torque transmitting mechanism interconnecting member.

18. The transmission of claim 17 wherein a sixth of the seven torque transmitting mechanisms is selectively engageable to interconnect the first member of the first planetary gear set and the third member of the second planetary gear set with the stationary member.

19. The transmission of claim 18 wherein a seventh of the seven torque transmitting mechanisms is selectively engageable to interconnect the third member of the first planetary gear set with the stationary member.

20. The transmission of claim 12 wherein the input member is continuously connected for common rotation with the second member of the second planetary gear set and the output member is continuously connected for common rotation with the second member of the fourth planetary gear set.

21. The transmission of claim 12 wherein the first member of the first planetary gear set, the third member of the second planetary gear set, the first member of the third planetary gear set and the first member of the fourth planetary gear set are sun gears, the second members of the second, third and fourth planetary gear sets and the third member of the first planetary gear set are carrier members and the second member of the first planetary gear set, the first member of the second planetary gear set, the third member of the third planetary gear set and the third member of the fourth planetary gear set are ring gears.

22. A transmission comprising:
an input member;
an output member;
first, second, third and fourth planetary gear sets each having a sun gear, a carrier member and a ring gear, wherein the input member is continuously connected for common rotation with the carrier member of the second planetary gear set and the output member is continuously connected for common rotation with the carrier member of the fourth planetary gear set;
a first interconnecting member continuously interconnecting the ring gear of the first planetary gear set with the ring gear of the fourth planetary gear set;
a second interconnecting member continuously interconnecting the sun gear of the first planetary gear set with the sun gear of the second planetary gear set;
a third interconnecting member continuously interconnecting the ring gear of the second planetary gear set with the sun gear of the third planetary gear set;
a fourth interconnecting member continuously interconnecting the ring gear of the third planetary gear set with the sun gear of the fourth planetary gear set;
a first torque transmitting mechanism selectively engageable to interconnect the ring gear of the third planetary gear set and the sun gear of the fourth planetary gear set with the carrier member of the second planetary gear set and the input member;
a second torque transmitting mechanism selectively engageable to interconnect the carrier member of the first planetary gear set with the ring gear of the second planetary gear set and the sun gear of the third planetary gear set;
a third torque transmitting mechanism selectively engageable to interconnect the ring gear of the second planetary gear set and the sun gear of the third planetary gear set with a torque transmitting mechanism interconnecting member;
a fourth torque transmitting mechanism selectively engageable to interconnect the carrier member of the third planetary gear set with the torque transmitting mechanism interconnecting member;
a fifth torque transmitting mechanism selectively engageable to interconnect the ring gear of the first planetary gear set and the ring gear of the fourth planetary gear set with the torque transmitting mechanism interconnecting member;
a sixth torque transmitting mechanism selectively engageable to interconnect the sun gear of the first planetary gear set and the sun gear of the second planetary gear set with the stationary member; and
a seventh torque transmitting mechanism selectively engageable to interconnect the carrier member of the first planetary gear set with the stationary member, and
wherein the torque transmitting mechanisms are selectively engageable in combinations of at least four to establish a plurality of forward speed ratios and at least one reverse speed ratio between the input member and the output member.

* * * * *